US011610532B2

(12) United States Patent
Zhu

(10) Patent No.: US 11,610,532 B2
(45) Date of Patent: Mar. 21, 2023

(54) DISPLAY PANEL AND DISPLAY DEVICE

(71) Applicant: TCL CHINA STAR OPTOELECTRONICS TECHNOLOGY CO., LTD., Shenzhen (CN)

(72) Inventor: Jing Zhu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 415 days.

(21) Appl. No.: 16/757,784

(22) PCT Filed: Apr. 7, 2020

(86) PCT No.: PCT/CN2020/083577
§ 371 (c)(1),
(2) Date: Apr. 21, 2020

(87) PCT Pub. No.: WO2021/174632
PCT Pub. Date: Sep. 10, 2021

(65) Prior Publication Data

US 2022/0309986 A1 Sep. 29, 2022

(30) Foreign Application Priority Data

Mar. 6, 2020 (CN) ......................... 202010149445.1

(51) Int. Cl.

| | |
|---|---|
| ***G09G 3/20*** | (2006.01) |
| ***G02F 1/1362*** | (2006.01) |
| ***G02F 1/1343*** | (2006.01) |

(52) U.S. Cl.
CPC ... *G09G 3/2092* (2013.01); *G09G 2300/0426* (2013.01)

(58) Field of Classification Search
None
See application file for complete search history.

(56) References Cited

U.S. PATENT DOCUMENTS 6,496,238 B1 * 12/2002 Greene ................ G02F 1/1345 349/73
9,097,950 B2 * 8/2015 Zhao .................... G09G 3/3648
(Continued)

FOREIGN PATENT DOCUMENTS

CN 101216647 A 7/2008
CN 101887892 A 11/2010
(Continued)

*Primary Examiner* — Sepehr Azari
(74) *Attorney, Agent, or Firm* — PV IP PC; Wei Te Chung; Ude Lu

(57) ABSTRACT

The present invention provides a display panel and a display device. The display panel comprises a first substrate, a driving circuit layer, a first common electrode layer, and at least one scanning signal transmission line located between two adjacent data lines and arranged in parallel with the data lines. The scanning signal transmission line and the driving circuit layer are arranged in a same layer. The present invention reduces widths of frames and increases display aperture ratio by directing the scanning signal transmission line to a bottom edge of the display panel and setting the scanning signal transmission line in pixel units.

19 Claims, 3 Drawing Sheets

(56) References Cited

U.S. PATENT DOCUMENTS

| | | | | |
|---|---|---|---|---|
| 9,293,102 | B1 * | 3/2016 | Chiu | G02F 1/1345 |
| 9,367,163 | B2 * | 6/2016 | Xu | G02F 1/136286 |
| 9,389,476 | B2 * | 7/2016 | Park | G09G 3/3677 |
| 10,126,618 | B2 * | 11/2018 | Kawamura | G02F 1/136227 |
| 10,170,072 | B2 * | 1/2019 | Yang | G09G 5/003 |
| 10,210,830 | B2 * | 2/2019 | Yang | G06F 3/0446 |
| 10,871,853 | B2 * | 12/2020 | Kurasawa | G02F 1/13338 |
| 10,910,355 | B2 * | 2/2021 | Cok | H01L 25/0753 |
| 11,126,049 | B2 * | 9/2021 | Baba | G02F 1/136204 |
| 11,320,710 | B2 * | 5/2022 | Lee | G02F 1/136286 |
| 2003/0147018 | A1 * | 8/2003 | Sano | H01L 29/78633 257/E27.111 |
| 2007/0070282 | A1 | 3/2007 | Shibahara et al. | |
| 2010/0066967 | A1 * | 3/2010 | Takahashi | G09G 3/20 349/151 |
| 2011/0128261 | A1 * | 6/2011 | Hung | G09G 3/3648 345/87 |
| 2012/0127412 | A1 * | 5/2012 | Lee | G02F 1/136286 349/139 |
| 2014/0152938 | A1 * | 6/2014 | Lee | G09G 3/3648 438/30 |
| 2014/0375534 | A1 * | 12/2014 | Lee | G09G 3/3648 345/87 |
| 2014/0375922 | A1 * | 12/2014 | Park | G02F 1/136286 349/46 |
| 2016/0300854 | A1 * | 10/2016 | Kawamura | G02F 1/136227 |
| 2017/0084247 | A1 * | 3/2017 | Yang | G09G 5/003 |
| 2018/0203294 | A1 * | 7/2018 | Chen | G02B 27/30 |
| 2018/0203565 | A1 | 7/2018 | Lu et al. | |
| 2018/0301472 | A1 * | 10/2018 | Matsukizono | H01L 27/3241 |
| 2019/0102042 | A1 * | 4/2019 | Kurasawa | G02F 1/136286 |
| 2020/0272010 | A1 * | 8/2020 | Lee | G02F 1/136286 |

FOREIGN PATENT DOCUMENTS

| | | | |
|---|---|---|---|
| CN | 104731465 | A | 6/2015 |
| CN | 106373969 | A | 2/2017 |
| CN | 107026177 | A | 8/2017 |
| KR | 20180031125 | A | 3/2018 |

* cited by examiner

DISPLAY PANEL AND DISPLAY DEVICE

FIELD OF INVENTION

The present disclosure relates to the field of display technology, and more particularly, to a display panel and a display device.

BACKGROUND OF INVENTION

With improvement of living standards, people's demand for display screens with narrow frames and high aperture ratio is becoming increasingly higher.

In the prior art, scanning signal line transmission lines are arranged between adjacent pixel units in a display region of display panels, which increase a distance between adjacent pixel units, resulting in a decrease in aperture ratio of the pixel units.

Thus, a display panel and a display device are urgently needed to solve the above technical problems.

SUMMARY OF INVENTION

The present disclosure provides a display panel and a display device to solve the technical problems in the prior art that scanning signal line transmission lines are arranged between adjacent pixel units in a display region of display panels, which increases a distance between adjacent pixel units, resulting in a decrease in aperture ratio of the pixel units.

In order to solve the above problems, the present disclosure provides following technical solutions.

A display panel comprises a first substrate, a driving circuit layer located on the first substrate, and a first common electrode layer located on the driving circuit layer. The display panel further comprises at least one scanning signal transmission line located between two adjacent data lines and arranged in parallel with the data lines, and one of the scanning signal transmission lines is connected to one of the data lines. Wherein, the scanning signal transmission line and the driving circuit layer are arranged in a same layer.

In the display panel of the present disclosure, the first common electrode layer comprises a plurality of first trunk electrodes and a plurality of second trunk electrodes, and an orthographic projection of the scanning signal transmission line on the first common electrode layer is located in the first trunk electrodes, wherein the first trunk electrodes and the second trunk electrodes are vertically arranged.

In the display panel of the present disclosure, the scanning signal transmission line and a gate layer in the driving circuit layer are arranged in a same layer, the scanning signal transmission line comprises a plurality of first signal transmission units being parallel to the data lines, and a first jumper connected to two adjacent first signal transmission units, wherein the first jumper and the first signal transmission units are arranged on different layers, and the first jumper is electrically connected to the two adjacent first signal transmission units by a through-hole.

In the display panel of the present disclosure, the scanning signal transmission line and a source/drain layer in the driving circuit layer are arranged in a same layer, and the scanning signal transmission line is electrically connected to a gate layer in the driving circuit layer by a through-hole.

In the display panel of the present disclosure, the scanning signal transmission line and a semiconductor layer in the driving circuit layer are arranged in a same layer, and the scanning signal transmission line is electrically connected to a gate layer in the driving circuit layer by a through-hole.

In the display panel of the present disclosure, the scanning signal transmission line and a light-shielding layer in the driving circuit layer are arranged in a same layer, and the scanning signal transmission line is electrically connected to a gate layer in the driving circuit layer by a through-hole.

In the display panel of the present disclosure, the scanning signal transmission line comprises a first scanning signal transmission line and a second scanning signal transmission line. The first scanning signal transmission line is connected in parallel with the second scanning signal transmission line. The first scanning signal transmission line and a gate layer in the driving circuit layer are arranged in a same layer, and the second scanning signal transmission line and a source/drain layer in the driving circuit layer are arranged in a same layer. The first scanning signal transmission line comprises a plurality of second signal transmission units being parallel to the data lines, and a second jumper connected to two adjacent second signal transmission units. The second jumper and the second signal transmission units are arranged on different layers, and the second jumper is electrically connected to the two adjacent second signal transmission units by a through-hole.

In the display panel of the present disclosure, a length of the scanning signal transmission line is gradually decreased in a direction from a side of the display panel to a central region of the display panel.

In the display panel of the present disclosure, a cross-sectional area of the scanning signal transmission line away from a central region of the display panel is greater than a cross-sectional area of the scanning signal transmission line close to the central region of the display panel.

In the display panel of the present disclosure, the scanning signal transmission line is made of a transparent material.

A display device comprises a display panel, and a polarizer layer and a cover layer located on the display panel. The display panel comprises a first substrate, a driving circuit layer located on the first substrate, and a first common electrode layer located on the driving circuit layer. The display panel further comprises at least one scanning signal transmission line located between two adjacent data lines and arranged in parallel with the data lines, and one of the scanning signal transmission lines is connected to one of the data lines. Wherein, the scanning signal transmission line and the driving circuit layer are arranged in a same layer.

In the display device of the present disclosure, the first common electrode layer comprises a plurality of first trunk electrodes and a plurality of second trunk electrodes, and an orthographic projection of the scanning signal transmission line on the first common electrode layer is located in the first trunk electrodes, wherein the first trunk electrodes and the second trunk electrodes are vertically arranged.

In the display device of the present disclosure, the scanning signal transmission line and a gate layer in the driving circuit layer are arranged in a same layer, the scanning signal transmission line comprises a plurality of first signal transmission units being parallel to the data lines, and a first jumper connected to two adjacent first signal transmission units, wherein the first jumper and the first signal transmission units are arranged on different layers, and the first jumper is electrically connected to the two adjacent first signal transmission units by a through-hole.

In the display device of the present disclosure, the scanning signal transmission line and a source/drain layer in the driving circuit layer are arranged in a same layer, and the scanning signal transmission line is electrically connected to a gate layer in the driving circuit layer by a through-hole.

In the display device of the present disclosure, the scanning signal transmission line and a semiconductor layer in the driving circuit layer are arranged in a same layer, and the scanning signal transmission line is electrically connected to a gate layer in the driving circuit layer by a through-hole.

In the display device of the present disclosure, the scanning signal transmission line and a light-shielding layer in the driving circuit layer are arranged in a same layer, and the scanning signal transmission line is electrically connected to a gate layer in the driving circuit layer by a through-hole.

In the display device of the present disclosure, the scanning signal transmission line comprises a first scanning signal transmission line and a second scanning signal transmission line. The first scanning signal transmission line is connected in parallel with the second scanning signal transmission line. The first scanning signal transmission line and a gate layer in the driving circuit layer are arranged in a same layer, and the second scanning signal transmission line and a source/drain layer in the driving circuit layer are arranged in a same layer. The first scanning signal transmission line comprises a plurality of second signal transmission units being parallel to the data lines, and a second jumper connected to two adjacent second signal transmission units. The second jumper and the second signal transmission units are arranged on different layers, and the second jumper is electrically connected to the two adjacent second signal transmission units by a through-hole.

In the display device of the present disclosure, a length of the scanning signal transmission line is gradually decreased in a direction from a side of the display panel to a central region of the display panel.

In the display device of the present disclosure, a cross-sectional area of the scanning signal transmission line away from a central region of the display panel is greater than a cross-sectional area of the scanning signal transmission line close to the central region of the display panel.

In the display device of the present disclosure, the scanning signal transmission line is made of a transparent material.

In the present disclosure, the scanning signal transmission line is disposed in pixel units by directing the scanning signal transmission line to a bottom edge of the display panel through a display region of the display panel, which reduces widths of the other three frames of display screens, increases display aperture ratio of the display panel, and improves display effect.

DETAILED DESCRIPTION OF PREFERRED EMBODIMENTS

Figure 1:
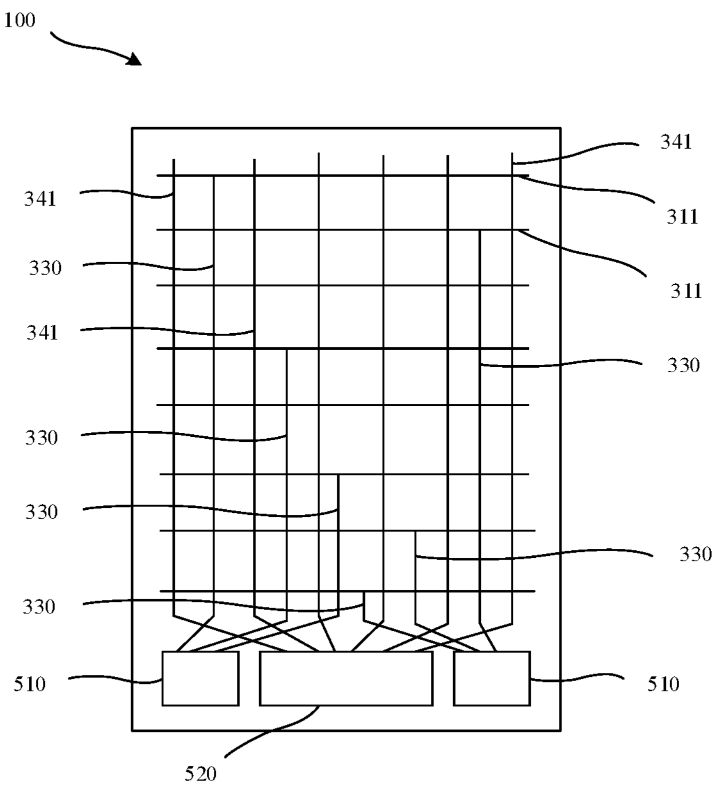
FIG. 1 is a schematic top view of a display panel of the present disclosure.

The present disclosure provides a display panel and a display device. In order to make purposes, technical solutions, and effects of the present disclosure clearer and more definite, following describes the present disclosure in detail with reference to the drawings and examples. It should be understood that specific embodiments described herein are only used to explain the present disclosure, and are not intended to limit the present disclosure.

Refer to FIG. 1 to FIG. 6, the present disclosure provides a display panel 100, the display panel 100 comprises a first substrate 200, a driving circuit layer 300 located on the first substrate 200, and a first common electrode layer 400 located on the driving circuit layer 300.

The display panel 100 further comprises at least one scanning signal transmission line 330 located between two adjacent data lines 341 and arranged in parallel with the data lines 341, and one of the scanning signal transmission lines 330 is connected to one of a plurality of gate lines 311.

Wherein, the scanning signal transmission line 330 and the driving circuit layer 300 are arranged in a same layer.

In the present disclosure, the scanning signal transmission line is disposed in pixel units by directing the scanning signal transmission line to a bottom edge of the display panel through a display region of the display panel, which reduces widths of the other three frames of display screens, increases display aperture ratio of the display panel, and improves display effect.

The technical solutions of the present disclosure will be described in combination with specific embodiments.

Refer to FIG. 1 to FIG. 6, the display panel 100 comprises the first substrate 200, the driving circuit layer 300 located on the first substrate 200, and the first common electrode layer 400 located on the driving circuit layer 300. The display panel 100 further comprises the at least one scanning signal transmission line 330 located between the two adjacent data lines 341 and arranged in parallel with the data lines 341, and one of the scanning signal transmission lines 330 is connected to one of the plurality of gate lines 311. Wherein, the scanning signal transmission line 330 and the driving circuit layer 300 are arranged in a same layer.

In order to facilitate understanding, the following embodiments are described by using a color filter on array (COA) substrate as an example, and the display panel 100 is not limited.

In the present embodiment, the display panel 100 further comprises a color film layer 600 located on the first common electrode layer 400. Refer to FIG. 3 to FIG. 6 for details.

In the present embodiment, the driving circuit layer 300 comprises a gate layer, a gate insulation layer 320 located on the gate layer, and a source/drain layer 340 located on the gate insulation layer 320. Refer to FIG. 3 to FIG. 6 for details.

In the present embodiment, the source/drain layer 340 comprises a plurality of the data lines 341 arranged in parallel, and the data lines 341 and gate lines 311 are vertically arranged. Refer to FIG. 3 to FIG. 6 for details.

In the present disclosure, the driving circuit layer 300 further comprises a semiconductor layer, and the semiconductor is an active layer. The semiconductor layer may be located on the source/drain layer 340, or the semiconductor layer may be located on the gate insulation layer 320, or the gate layer may be located on the semiconductor layer and the semiconductor layer may be located on the first substrate 200. The specific position of the semiconductor layer is not limited here.

In the present embodiment, the first common electrode layer 400 comprises a pixel electrode layer.

In the present embodiment, the first common electrode layer 400 is electrically connected to the source/drain layer 340 by a through-hole.

Figure 2:
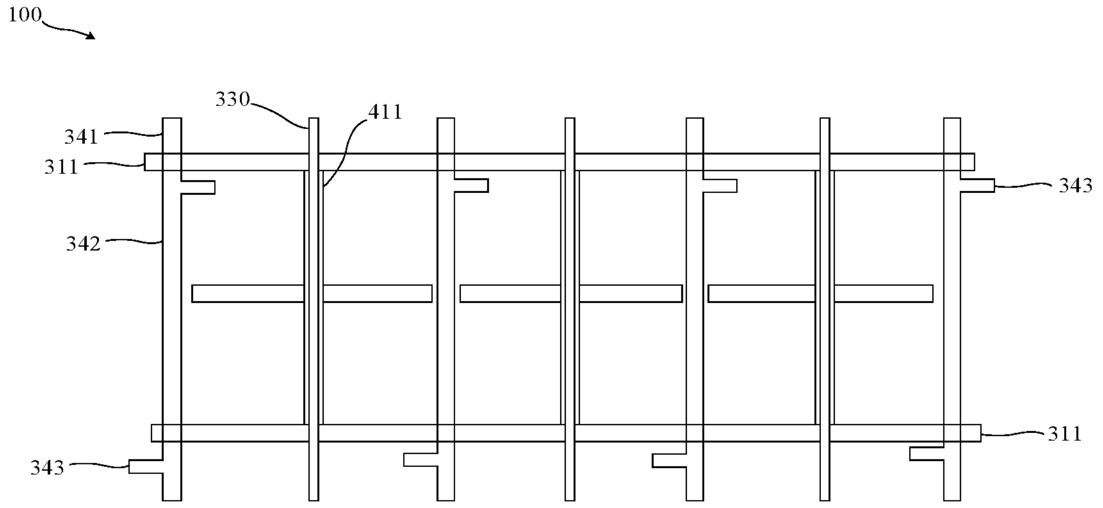
FIG. 2 is a schematic partial top view of the display panel of the present disclosure.

In the present embodiment, the display panel 100 further comprises a flip-chip film layer located on a bottom side of the display panel 100, and the flip-chip film layer comprises a first flip-chip film layer 510 and a second flip-chip film layer 520. The first flip-chip film layer 510 is electrically connected to the gate lines 311 of the gate layer through the scanning signal transmission line 330. The second flip-chip film layer 520 is electrically connected to the data lines 341 through a data signal transmission line. Refer to FIG. 2 for details. The data signal transmission line is an extension of the data line 341. The second flip-chip film layer 520 is located in a central region of the bottom edge of the display panel 100, and the first flip-chip film layer 510 is located on both sides of the second flip-chip film layer 520.

In the present embodiment, the first common electrode layer 400 comprises a plurality of first trunk electrodes 411 and a plurality of second trunk electrodes, and an orthographic projection of the scanning signal transmission line 330 on the first common electrode layer 400 is located in the first trunk electrodes 411, wherein the first trunk electrodes 411 and the second trunk electrodes are vertically arranged. The data lines 341 and the gate lines 311 divide the first common electrode layer 400 into a plurality of pixel units, any one of the pixel units comprises one of the first trunk electrodes 411 and one of the corresponding second trunk electrodes, an orthographic projection of the scanning signal transmission line 330 in one of the pixel units on the first common electrode layer 400 is located in one of the corresponding first trunk electrodes 411. Refer to FIG. 2 for details. By arranging the scanning signal transmission line 330 under a main electrode, dark lines of the main electrode are used to block gate fan-out lines, thereby reducing frame of the display screens, increasing display aperture ratio of the display panel 100, and improving display effect.

Figure 4:
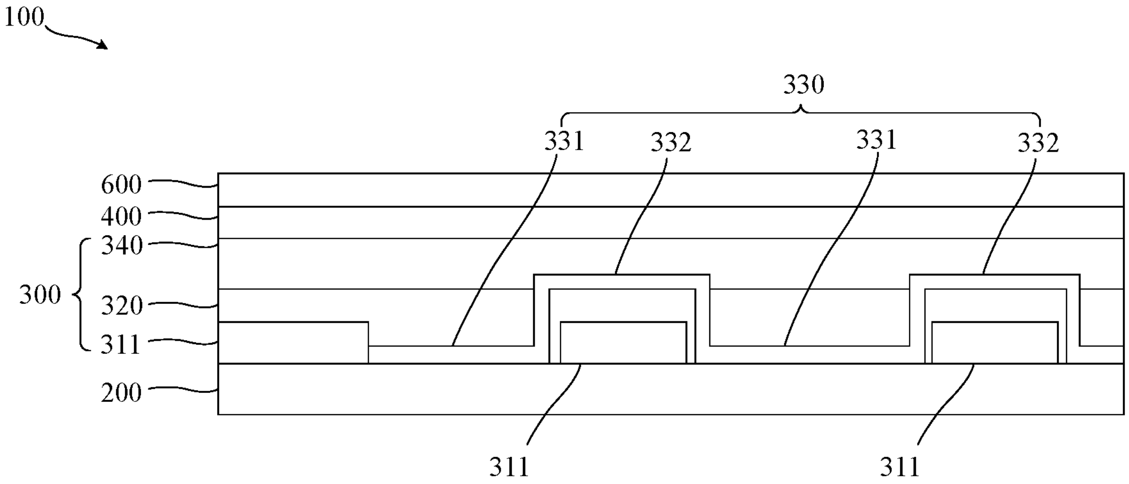
FIG. 4 is a second schematic structural diagram of the display panel of the present disclosure.

In the embodiment, the scanning signal transmission line 330 and the gate layer in the driving circuit layer 300 are arranged in a same layer. The scanning signal transmission line 330 comprises a plurality of first signal transmission units 331 being parallel to the data lines 341, and a first jumper 332 connected to two adjacent first signal transmission units 331. The first jumper 332 and the first signal transmission units 331 are arranged on different layers, and the first jumper 332 is electrically connected to the two adjacent first signal transmission units 331 by a through-hole. Refer to FIG. 4 for details. The scanning signal transmission line 330 is on the gate layer, and a same photomask process as the gate is used for the scanning signal transmission line 330 to better connect to the gate. In order to prevent the scanning signal transmission line 330 from not being connected to a non-corresponding gate, the jumper arrangement is required to prevent being short-circuiting, thereby achieving a stable and good connection effect between the scanning signal transmission line 330 and the gate.

Figure 3:
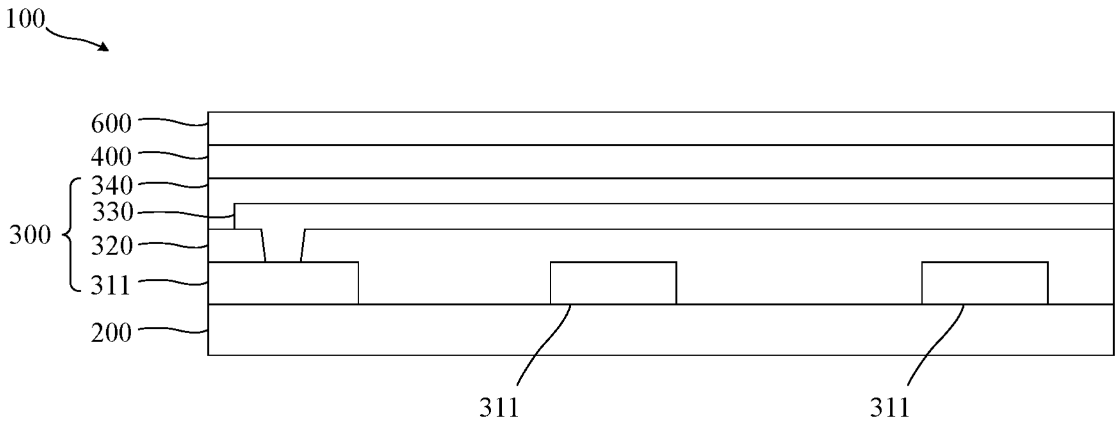
FIG. 3 is a first schematic structural diagram of the display panel of the present disclosure

In the present embodiment, the scanning signal transmission line 330 and the source/drain layer 340 in the driving circuit layer 300 are arranged in a same layer. The scanning signal transmission line 330 is electrically connected to the gate layer in the driving circuit layer 300 by a through-hole. Refer to FIG. 3 for details. The scanning signal transmission line 330 and the source/drain are arranged in a same layer, and the scan signal transmission line 330, the source/drain layer 340, and the data lines 341 can be simultaneously formed through a same mask process, which simplifies processes while avoiding a jumper process.

Figure 6:
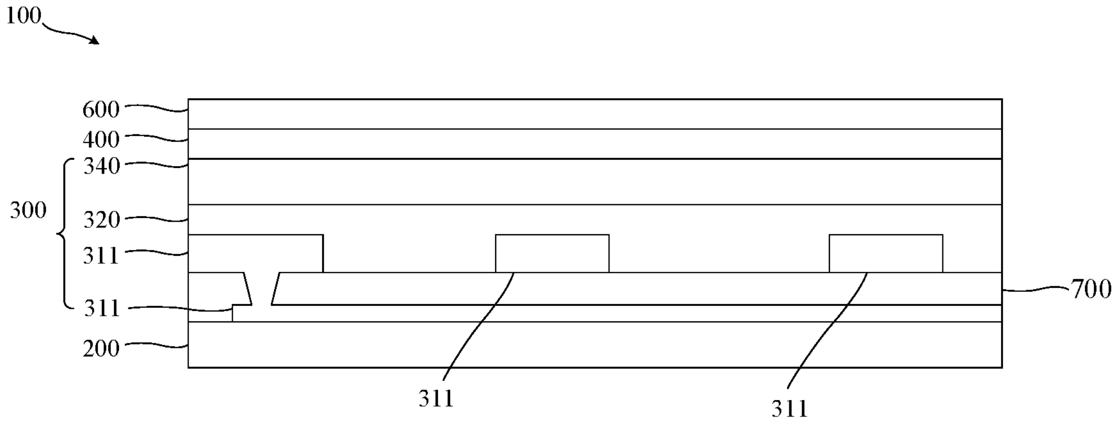
FIG. 6 is a fourth schematic structural diagram of the display panel of the present disclosure.
Figure 7:
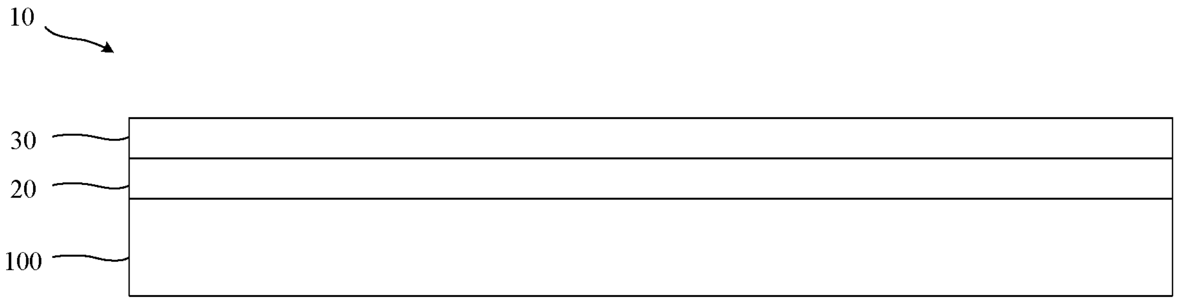
FIG. 7 is a schematic structural diagram of a display device of the present disclosure.

In the present embodiment, the scanning signal transmission line 330 and a light-shielding layer 700 in the driving circuit layer 300 are arranged in a same layer. The scanning signal transmission line 330 is electrically connected to the gate layer in the driving circuit layer 300 by a through-hole. The light-shielding layer 700 is located between the first substrate 200 and the driving circuit layer 300. Refer to FIG. 6 for details. The scanning signal transmission line 330 and the light-shielding layer 700 are arranged in a same layer, and the light-shielding layer 700 prevents elements of an array substrate of the display panel 100 from being exposed to light for a long time. Since film structure of the light-shielding layer 700 is not very complicated, there can be more space for setting the scanning signal transmission line 330, and the standard for etching precision of etching process is not very high, which saves costs and reduces difficulty of processes.

In the present embodiment, the scanning signal transmission line 330 and the semiconductor layer in the driving circuit layer 300 are arranged in a same layer. The scanning signal transmission line 330 is electrically connected to the gate layer in the driving circuit layer 300 by a through-hole, which is similar to the scanning signal transmission line 330 and the light-shielding layer 700 in the driving circuit layer 300 being arranged in a same layer. Reference may be made to the arrangement of FIG. 6, which will not be repeated here. The scanning signal transmission line and a semiconductor layer are arranged in a same layer, and the semiconductor layer comprises the active layer. Since film structure of the semiconductor layer is not very complicated, there can be more space for setting the scanning signal transmission line 330, and the standard for etching precision of etching process is not very high, which saves costs and reduces difficulty of processes.

Figure 5:
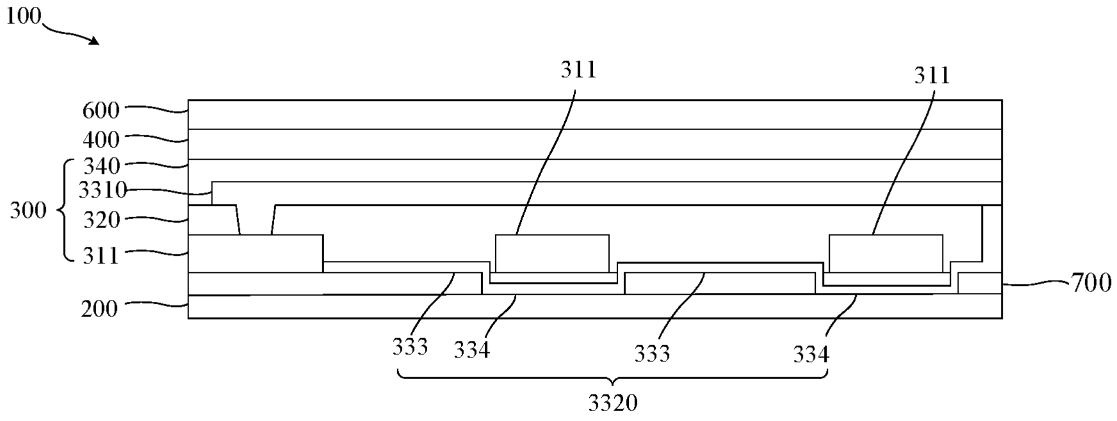
FIG. 5 is a third schematic structural diagram of the display panel of the present disclosure.

In the present embodiment, the scanning signal transmission line 330 comprises a first scanning signal transmission line 3310 and a second scanning signal transmission line 3320. The first scanning signal transmission line 3310 is connected in parallel with the second scanning signal transmission line 3320. The first scanning signal transmission line 3310 and the gate layer in the driving circuit layer 300 are arranged in a same layer, and the second scanning signal transmission line 3320 and the source/drain layer 340 in the driving circuit layer 300 are arranged in a same layer. The first scanning signal transmission line 3310 comprises a plurality of second signal transmission units 333 being parallel to the data lines 341, and a second jumper 334 connected to two adjacent second signal transmission units 333. Refer to FIG. 5 for details. The scanning signal transmission line 330 reduces resistance of the scanning signal transmission line 330 by connecting to the first scan signal transmission line 3310 and the second scan signal transmission line 3320 in parallel, while preventing one of the scanning signal transmission lines 330 from experiencing failure to display normally, and reducing probability of display failure.

In the present embodiment, the first scanning signal transmission line 3310 may be arranged in a same layer as any one of the gate layer, the semiconductor layer, the light-shielding layer 700, and the source/drain layer 340. The second scanning signal transmission line 3320 and the first signal transmission line are arranged on different layers, and the first scanning signal transmission line 3310 is connected in parallel with the second scanning signal transmission line 3320. When the first scanning signal transmission line 3310 or the second scanning signal transmission line 3320 is arranged in a same layer as the gate layer, the first scanning signal transmission line 3310 or the second scanning signal transmission line 3320 adopts a jumper arrangement. For specific jumper arrangement, refer to the arrangement of the first jumper 332 and the arrangement of the second jumper 334. Refer to FIG. 5 for details, and the details are not described herein again.

In the present embodiment, the first flip-chip film layer 510 and the second flip-chip film layer 520 may be arranged in a same layer. In order to prevent the scan signal transmission line 330 from being connected to the data signal transmission line resulting in short-circuiting, when the scanning signal transmission line 330 and the data signal transmission line are arranged in a same layer, and any one of transmission line type in the scanning signal transmission line 330 or the data signal transmission line has a jump arrangement. The specific jumper arrangement is not described here.

In the present embodiment, a length of the scanning signal transmission line 330 is gradually decreased in a direction from a side of the display panel 100 to the central region of the display panel 100. Refer to FIG. 1 for details. The scanning lines connected to the scanning signal transmission line 330 and close to the central region of the display panel 100 are closer to the bottom edge of the display panel 100, which reduces the length of the scanning signal transmission line 330 close to the central region of the display panel 100, thereby saving materials and reducing its resistance values. This structural arrangement can allow resistance values of each scanning signal transmission line 330 to tend to be same.

In the present embodiment, a cross-sectional area of the scanning signal transmission line 330 away from the central region of the display panel 100 is greater than a cross-sectional area of the scanning signal transmission line 330 close to the central region of the display panel 100. In the display region of the display panel 100, the scanning signal transmission line 330 on both sides has a greater length, and a large cross-sectional area is required to reduce resistance, so that the resistance values of the scanning signal transmission lines 330 tend to be same.

In the present embodiment, a material of the scanning signal transmission line 330 is a transparent material, and the transparent material may comprise fine metal wires (Ag, Cu, Al, etc.), nano silver wires, graphene, indium tin oxide, or carbon nanotubes, and it is not limited herein. Therefore, light transmittance of the display panel 100 may be better increased, thereby increasing display aperture ratio and facilitating setting of position structure.

In the present embodiment, the scanning signal transmission line 330 comprises a third scanning signal transmission line and a fourth scanning signal transmission line. The third scanning signal transmission line is away from the central region of the display panel 100, and the fourth scanning signal transmission line is close to the central region of the display panel 100. The fourth scanning signal transmission line comprises a fourth horizontal scanning signal transmission line and a fourth vertical scanning signal transmission line. The fourth horizontal scanning signal transmission line is parallel to the gate lines 311, and the fourth vertical scanning signal transmission line is parallel to the third scanning signal transmission line. An orthographic projection of the fourth vertical scanning signal transmission line on a film layer of the third scanning signal transmission line coincides with the third scanning signal transmission line. The fourth vertical scanning signal transmission line and the third scanning signal transmission line are arranged in different layers. Directing the scanning signal transmission line 330 close to a center of the display panel 100 away from the center of the display panel 100 reduces the jumper while being close to the thin film electrode layer, and prevents excessive jumper punching from reducing strength of a floor structure of the display panel 100.

In the present embodiment, the data lines 341 comprise a first data line 342 and a plurality of first data connection lines 343. The first data line 342 is arranged in parallel with the scanning signal transmission line 330, and the first data connection lines 343 are connected to the first data line 342 and the source/drain layer 340 of the driving circuit layer 300. Wherein, connecting directions of two adjacent first data connection lines 343 of any one of the data lines 341 are opposite. Refer to FIG. 2 for details. The data lines 341 achieve electrode display effect similar to dot inversion through this connection method, which reduces power consumption, improves display color accuracy, and increases display color gamut.

In the present disclosure, the scanning signal transmission line is disposed in pixel units by directing the scanning signal transmission line to the bottom edge of the display panel through a display region of the display panel, which reduces widths of the other three frames of display screens, increases display aperture ratio of the display panel, and improves display effect.

Refer to FIG. 1 to FIG. 7, the present disclosure further provides a display device 10, the display device 10 comprises the display panel 100 according to any one of the above, a polarizer layer 20, and a cover layer 30 on the display panel 100.

In the present disclosure, the scanning signal transmission line is disposed in pixel units by directing the scanning signal transmission line to the bottom edge of the display panel through a display region of the display panel, which reduces widths of the other three frames of display screens, increases display aperture ratio of the display panel, and improves display effect.

The technical solutions of the present disclosure will be described in combination with specific embodiments.

The display device 10 comprises the display panel 100 according to any one of the above, the polarizer layer 20, and the cover layer 30 on the display panel 100.

In the present embodiment, the display panel 100 further comprise a backlight module and a color film layer 600. The display device 10 further comprises a liquid crystal layer located between the display panel 100 and the polarizer layer 20. Refer to FIG. 1 to FIG. 7 for details.

In the present embodiment, the display device 10 further comprises a light-emitting device layer located between the display panel 100 and the polarizer layer 20. The light-emitting device layer comprises an autonomous light-emitting material.

In the present embodiment, the display device 10 further comprises a black matrix layer for shielding non-light-emitting devices of the display device 10.

In the present disclosure, the scanning signal transmission line is disposed in pixel units by directing the scanning signal transmission line to the bottom edge of the display panel through a display region of the display panel, which reduces widths of the other three frames of display screens, increases display aperture ratio of the display panel, and improves display effect.

In summary, the present disclosure provides a display panel and a display device. The display panel comprises a first substrate, a driving circuit layer located on the first substrate, and a first common electrode layer located on the driving circuit layer. The display panel further comprises at least one scanning signal transmission line located between two adjacent data lines and arranged in parallel with the data lines, and one of the scanning signal transmission lines is connected to one of the data lines, wherein the scanning signal transmission line and the driving circuit layer are arranged in a same layer. In the present disclosure, the scanning signal transmission line is disposed in pixel units by directing the scanning signal transmission line to the bottom edge of the display panel through a display region of the display panel, which reduces widths of the other three frames of display screens, increases display aperture ratio of the display panel, and improves display effect.

It can be understood that for those of ordinary skill in the art, equivalent replacements or changes can be made according to technical solutions of the present disclosure and its inventive concept, and all these changes or replacements should fall within a protection scope of claims attached to the present disclosure.

What is claimed is:

1. A display panel, wherein the display panel comprises a first substrate, a driving circuit layer located on the first substrate, and a first common electrode layer located on the driving circuit layer; and the display panel comprises at least one scanning signal transmission line located between two adjacent data lines and arranged in parallel with the data lines, and one of the scanning signal transmission lines is connected to one of a plurality of gate lines;

wherein the scanning signal transmission line and the driving circuit layer are arranged in a same layer; and the first common electrode layer comprises a plurality of first trunk electrodes and a plurality of second trunk electrodes, the first trunk electrodes and the second trunk electrodes are vertically arranged, and an orthographic projection of the scanning signal transmission line on the first common electrode layer is located in the first trunk electrodes; the data lines and the gate lines divide the first common electrode layer into a plurality of pixel units, any one of the pixel units comprises one of the first trunk electrodes and a corresponding one of the second trunk electrodes, an orthographic projection of the scanning signal transmission line in one of the pixel units on the first common electrode layer is located in a corresponding one of the first trunk electrodes.

2. The display panel as claimed in claim 1, wherein the scanning signal transmission line and a gate layer in the driving circuit layer are arranged in a same layer; and the scanning signal transmission line comprises a plurality of first signal transmission units being parallel to the data lines, and a first jumper connected to two adjacent first signal transmission units;

wherein the first jumper and the first signal transmission units are arranged on different layers, and the first jumper is electrically connected to two adjacent first signal transmission units by a through-hole.

3. The display panel as claimed in claim 1, wherein the scanning signal transmission line and a source/drain layer in the driving circuit layer are arranged in a same layer; and the scanning signal transmission line is electrically connected to a gate layer in the driving circuit layer by a through-hole.

4. The display panel as claimed in claim 1, wherein the scanning signal transmission line and a semiconductor layer in the driving circuit layer are arranged in a same layer; and the scanning signal transmission line is electrically connected to a gate layer in the driving circuit layer by a through-hole.

5. The display panel as claimed in claim 1, wherein the scanning signal transmission line and a light-shielding layer in the driving circuit layer are arranged in a same layer; and the scanning signal transmission line is electrically connected to a gate layer in the driving circuit layer by a through-hole.

6. The display panel as claimed in claim 1, wherein the scanning signal transmission line comprises a first scanning signal transmission line and a second scanning signal transmission line;

the first scanning signal transmission line is connected in parallel with the second scanning signal transmission line;

the first scanning signal transmission line and a gate layer in the driving circuit layer are arranged in a same layer, and the second scanning signal transmission line and a source/drain layer in the driving circuit layer are arranged in a same layer;

the first scanning signal transmission line comprises a plurality of second signal transmission units being parallel to the data lines, and a second jumper connected to two adjacent second signal transmission units; and the second jumper and the second signal transmission units are arranged on different layers, and the second jumper is electrically connected to the two adjacent second signal transmission units by a through-hole.

7. The display panel as claimed in claim 1, wherein a length of the scanning signal transmission line is gradually decreased in a direction from a side of the display panel to a central region of the display panel; and in a non-display area, a length of the scanning signal transmission line near the central region of the display panel is greater than a length of the scanning signal transmission line away from the central region of the display panel.

8. The display panel as claimed in claim 1, wherein a cross-sectional area of the scanning signal transmission line away from a central region of the display panel is greater than a cross-sectional area of the scanning signal transmission line close to the central region of the display panel.

9. The display panel as claimed in claim 1, wherein the scanning signal transmission line is made of a transparent material.

10. The display panel as claimed in claim 1, wherein the display panel further comprises a flip-chip film layer located on a bottom side of the display panel, and the flip-chip film layer comprises a first flip-chip film layer and a second flip-chip film layer; the first flip-chip film layer is electrically connected to the gate lines of the gate layer through the scanning signal transmission line; and the second flip-chip film layer is electrically connected to the data lines through a data signal transmission line.

11. A display device, wherein the display device comprises a display panel, and a polarizer layer and a cover layer located on the display panel;

the display panel comprises a first substrate, a driving circuit layer located on the first substrate, and a first common electrode layer located on the driving circuit layer; and the display panel comprises at least one scanning signal transmission line located between two adjacent data lines and arranged in parallel with the data lines, and one of the scanning signal transmission lines is connected to one of a plurality of gate lines;

wherein the scanning signal transmission line and the driving circuit layer are arranged in a same layer; and the first common electrode layer comprises a plurality of first trunk electrodes and a plurality of second trunk electrodes, the first trunk electrodes and the second trunk electrodes are vertically arranged, and an orthographic projection of the scanning signal transmission line on the first common electrode layer is located in the first trunk electrodes; the data lines and the gate lines divide the first common electrode layer into a plurality of pixel units, any one of the pixel units comprises one of the first trunk electrodes and a corresponding one of the second trunk electrodes, an orthographic projection of the scanning signal transmission line in one of the pixel units on the first common electrode layer is located in a corresponding one of the first trunk electrodes.

12. The display device as claimed in claim 11, wherein the scanning signal transmission line and a gate layer in the driving circuit layer are arranged in a same layer; and the scanning signal transmission line comprises a plurality of first signal transmission units being parallel to the data lines, and a first jumper connected to two adjacent first signal transmission units.

13. The display device as claimed in claim 11, wherein the scanning signal transmission line and a source/drain layer in the driving circuit layer are arranged in a same layer; and the scanning signal transmission line is electrically connected to a gate layer in the driving circuit layer by a through-hole.

14. The display device as claimed in claim 11, wherein the scanning signal transmission line and a semiconductor layer in the driving circuit layer are arranged in a same layer; and the scanning signal transmission line is electrically connected to a gate layer in the driving circuit layer by a through-hole.

15. The display device as claimed in claim 11, wherein the scanning signal transmission line and a light-shielding layer in the driving circuit layer are arranged in a same layer; and the scanning signal transmission line is electrically connected to a gate layer in the driving circuit layer by a through-hole.

16. The display device as claimed in claim 11, wherein the scanning signal transmission line comprises a first scanning signal transmission line and a second scanning signal transmission line;

the first scanning signal transmission line is connected in parallel with the second scanning signal transmission line;

the first scanning signal transmission line and a gate layer in the driving circuit layer are arranged in a same layer, and the second scanning signal transmission line and a source/drain layer in the driving circuit layer are arranged in a same layer;

the first scanning signal transmission line comprises a plurality of second signal transmission units being parallel to the data lines, and a second jumper connected to two adjacent second signal transmission units; and the second jumper and the second signal transmission units are arranged on different layers, and the second jumper is electrically connected to the two adjacent second signal transmission units by a through-hole.

17. The display device as claimed in claim 11, wherein a length of the scanning signal transmission line is gradually decreased in a direction from a side of the display panel to a central region of the display panel; and in a non-display area, a length of the scanning signal transmission line near the central region of the display panel is greater than a length of the scanning signal transmission line away from the central region of the display panel.

18. The display device as claimed in claim 11, wherein a cross-sectional area of the scanning signal transmission line away from a central region of the display panel is greater than a cross-sectional area of the scanning signal transmission line close to the central region of the display panel.

19. The display device as claimed in claim 11, wherein the scanning signal transmission line is made of a transparent material.

* * * * *